United States Patent [19]
Crandall

[11] Patent Number: 5,645,938
[45] Date of Patent: Jul. 8, 1997

[54] RETROREFLECTIVE ARTICLE CONTAINING A POLYESTER POLYURETHANE BINDER LAYER

[75] Inventor: Michael D. Crandall, North Oaks, Minn.

[73] Assignee: Minnesota Mining and Manufacturing Company, St. Paul, Minn.

[21] Appl. No.: 528,568

[22] Filed: Sep. 15, 1995

[51] Int. Cl.⁶ .................................................. B32B 9/04
[52] U.S. Cl. .................... 428/411.1; 428/72; 428/143; 428/164; 428/323; 428/327; 428/406; 428/407; 428/913; 442/73; 442/132; 442/148
[58] Field of Search ............................. 428/195, 174, 428/187, 203, 212, 221, 254, 323, 402, 411.1, 488.4, 688, 423.1, 72, 143, 164, 240, 241, 261, 269, 283, 327, 406, 407, 913

[56] References Cited

U.S. PATENT DOCUMENTS

| | | | |
|---|---|---|---|
| 3,758,192 | 9/1973 | Bingham | 350/105 |
| 4,576,850 | 3/1986 | Martens | 428/156 |
| 4,721,649 | 1/1988 | Belisle et al. | 428/325 |
| 4,725,494 | 2/1988 | Belisle et al. | 428/325 |
| 4,763,985 | 8/1988 | Bingham | 350/105 |
| 4,988,541 | 1/1991 | Hedblom | 427/163 |
| 5,008,142 | 4/1991 | Wilson et al. | 428/203 |
| 5,069,964 | 12/1991 | Tolliver et al. | 428/325 |
| 5,085,918 | 2/1992 | Rajan et al. | 428/195 |
| 5,117,304 | 5/1992 | Huang et al. | 359/529 |
| 5,127,973 | 7/1992 | Sengupta et al. | 156/60 |
| 5,194,113 | 3/1993 | Lasch et al. | 156/243 |
| 5,200,262 | 4/1993 | Li | 428/266 |
| 5,254,390 | 10/1993 | Lu | 428/156 |
| 5,266,384 | 11/1993 | O'Dell et al. | 428/207 |
| 5,283,101 | 2/1994 | Li | 428/141 |
| 5,338,595 | 8/1994 | Li | 428/143 |
| 5,344,705 | 9/1994 | Olsen | 428/323 |

FOREIGN PATENT DOCUMENTS

| | | | |
|---|---|---|---|
| 0082618 | 6/1983 | European Pat. Off. | C09D 3/72 |
| 0326186A2 | 8/1989 | European Pat. Off. | G02B 5/128 |
| 0602599A1 | 6/1994 | European Pat. Off. | G02B 5/128 |
| 0615788A1 | 9/1994 | European Pat. Off. | B05D 5/06 |
| 4-24647 | 1/1992 | Japan | G03G 9/08 |
| 5-298934 | 4/1992 | Japan | H01B 7/02 |
| 6-10319 | 1/1994 | Japan | E01F 9/04 |
| WO92/07990 | 5/1992 | WIPO | B41M 3/12 |
| WO92/16576 | 10/1992 | WIPO | C08G 18/76 |
| WO93/17188 | 9/1993 | WIPO | E01F 9/04 |

OTHER PUBLICATIONS

Derwent Publication for JP 6010319.
Derwent Publication for JP 5298934.
Derwent Publication for JP 4024647.

*Primary Examiner*—William Krynski
*Attorney, Agent, or Firm*—Gary L. Griswold; Walter N. Kirn; Karl G. Hanson

[57] ABSTRACT

A retroreflective article 10 includes retroreflective elements 12 partially embedded in a binder layer 14 that comprises a polyester polyurethane polymer. The polyurethane polymer is a reaction product of (i) a polyester polyol that contains an aromatic nucleus and has at least two isocyanate groups bonded non-conjugatively to the aromatic nucleus, and (ii) a polyisocyanate. A retroreflective article that employs a binder layer of this kind demonstrates extraordinary laundering durability under stringent wash conditions.

32 Claims, 2 Drawing Sheets

RETROREFLECTIVE ARTICLE CONTAINING A POLYESTER POLYURETHANE BINDER LAYER

TECHNICAL FIELD

The present invention pertains to a retroreflective article that contains a polyurethane binder layer that is the reaction product of a polyester polyol and a polyisocyanate where the polyisocyanate contains at least two isocyanate groups bonded non-conjugatively to at least one aromatic nucleus. The invention also pertains to an article of clothing that displays such a retroreflective article.

BACKGROUND

Retroreflective articles return incident light back towards the light source. This unique ability has promoted widespread use of retroreflective articles on clothing.

Persons who work or exercise near motor vehicle traffic need to be conspicuously visible so that they do not get struck by passing motor vehicles. Retroreflective articles highlight a person's presence to motorists at nighttime by retroreflecting light from motor vehicle headlamps. Light from the headlamps strikes the retroreflective article on the wearer's clothing and is returned toward the motor vehicle, enabling the driver to become aware of the person's presence. The bright image displayed by the retroreflective article gives motorists more time to react.

Because retroreflective articles are frequently used on clothing, they must be able to withstand laundering conditions—otherwise, the articles cannot continue to serve their safety function after repeated washings. Investigators who work in the retroreflective art are aware of this problem, and therefore they pursue an ongoing goal of developing launderably-durable retroreflective articles so that persons who wear retroreflective clothing remain conspicuously visible after their clothing has been worn and laundered many times.

Investigators also recognize that the need to develop such articles is particularly pronounced for clothing that is frequently worn in squalid environments. Examples of such clothing includes firemen's jackets and construction workers' safety vests. Because these garments are often subjected to harsh conditions, they tend to get very dirty and therefore require cleaning under industrial laundering conditions, which typically involve wash temperatures as high as 40° to 90° C. (105° to 190° F.) and pH values of 10 to 12.5.

Some launderably-durable retroreflective articles that have been developed for use on clothing comprise an exposed layer of transparent microspheres, a polymeric binder layer, and a specularly reflective layer. The transparent microspheres are partially embedded in the polymeric binder layer, and the specularly reflective layer underlies the microsphere's embedded portions. Because the microspheres are exposed—that is, they are not covered by a light-transmissible polymeric layer—the articles are commonly referred to as "exposed lens retroreflective articles". Light that strikes the front surface of these retroreflective articles enters the transparent microspheres to have its direction altered to strike the underlying specularly reflective layer where it is reflected to reenter the microspheres where its direction is again altered but this time back in the direction of the light source.

In a successful attempt at developing an exposed lens retroreflective article that is durable under industrial laundering conditions, Wu Shyong Li in U.S. Pat. No. 5,200,262 partially embedded a monolayer of metal-coated microspheres in a binder layer that contained a flexible polymer and one or more isocyanate-functional silane coupling agents. The flexible polymers included isocyanate curable polyesters and one or two component polyurethanes.

In another successful attempt, Li used a binder layer that was formed from an electron-beam curable polymer and typically one or more crosslinkers and silane coupling agents (see U.S. Pat. No. 5,283,101). The electron-beam curable polymers included chlorosulfonated polyethylenes, ethylene copolymers comprising at least about 70 weight percent of polyethylene such as ethylene/vinyl acetate, ethylene/acrylate and ethylene/acrylic acid, and poly(ethylene-co-propylene-co-diene) polymers. The microspheres were embedded in the cured binder layer, and a specular reflective metal layer was disposed on the microsphere's embedded portions.

In another approach, Michael Crandall et al. disclosed making a retroreflective article launderably-durable by placing a compound that contains an aromatic bidentate moiety in chemical association with the reflective metal layer. In one embodiment, the compound is disposed in a polymeric binder layer that preferably includes a crosslinked or virtually crosslinked elastomer. Crosslinked polymers include polyolefins, polyesters, polyurethanes, polyepoxides, and natural or synthetic rubbers. This product is disclosed in U.S. patent application Ser. No. 08/216,404 now U.S. Pat. No. 5,474,827.

SUMMARY OF THE INVENTION

The present invention provides a new retroreflective article that is extraordinarily durable under industrial wash conditions. The new article includes a layer of retroreflective elements at least partially embedded in a binder layer that comprises a polyurethane polymer that is the reaction product of (i) a polyester polyol and (ii) a polyisocyanate that contains at least two isocyanate groups bonded non-conjugatively to at least one aromatic nucleus.

In another aspect, the present invention provides a transfer for supplying a retroreflective article to a garment assembler and also to an article of clothing that has the inventive retroreflective article disposed on its outer surface.

The present invention differs from known retroreflective articles in that the binder layer comprises a polyurethane polymer that is derived from a polyester polyol and a polyisocyanate, where the latter contains at least two isocyanate groups bonded non-conjugatively to at least one aromatic nucleus.

The inventor discovered that this binder layer can provide retroreflective articles with excellent laundering durability. The retroreflective articles are able to retain a large percentage of their initial retroreflectivity after repeated washings under industrial conditions. The improved wash performance predictably stems from the binder layer's flexibility and hydrolytic stability. These factors—it is believed—helps firmly retain the retroreflective elements in the binder layer and also hampers oxidation of the retroreflective elements when a metal reflector is used. Oxidized metal is unable to retroreflect light to a significant extent.

BRIEF DESCRIPTION OF THE DRAWINGS

In the drawings:

FIGS. 1–3 are idealized and are not drawn to scale.

DETAILED DESCRIPTION OF PREFERRED EMBODIMENTS

Figure 1:
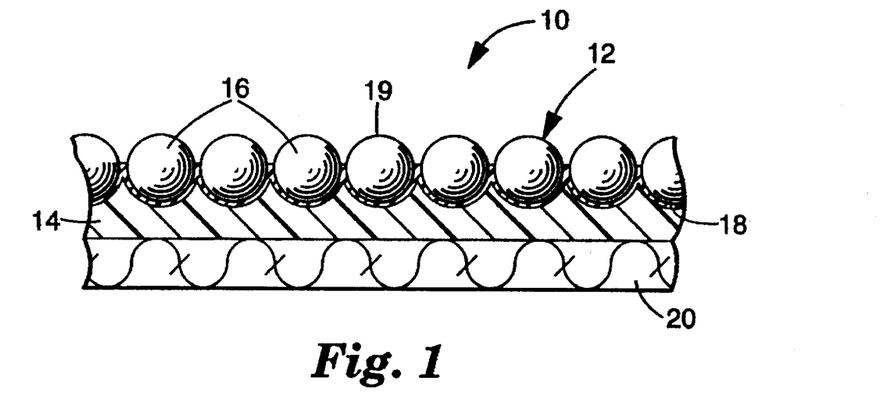
FIG. 1 is a cross-sectional view of a retroreflective article 10 in accordance with the present invention.

FIG. 1 illustrates a retroreflective article 10 that includes retroreflective elements 12 partially embedded in a binder layer 14. The retroreflective elements 12 include optical elements in the form of microspheres 16, and a specularly reflective layer 18. The microspheres 16 and the specularly reflective layer 18 return a substantial quantity of incident light towards the light source. Light that strikes the retroreflective article's front surface 19 passes through microspheres 16 and is reflected by layer 18 to again reenter the microspheres, where the light's direction is again altered to return towards the light source. A fabric 20 is shown bonded to the opposite side of binder layer 14 to improve the article's structural integrity. Retroreflective article 10 may be applied to a substrate (not shown) that forms part of an article of clothing.

The binder layer contains a polyurethane polymer that is a reaction product of (i) a polyester polyol and (ii) a polyisocyanate that contains at least two isocyanate groups bonded non-conjugatively to at least one aromatic nucleus. The polyurethane polymer contains the urethane group, —NH.CO.O—, but the polymer also may contain other groups such as urea groups. Urea groups may be present in the polymer when a diamine chain extender is used in the reaction mixture as discussed below.

The polyurethane polymer preferably is formed by reacting a mixture of polyester polyols, polyisocyanate, and chain extender in a one-shot process. In a one-shot process, polymerization is carried out in a single reaction, as opposed to a prepolymer process that includes additional steps (a prepolymer is first formed and is subsequently reacted with the chain extender). A catalyst also may be added to the reaction mixture to facilitate polymer formation.

The polyester polyols may have a functionality up to about 8 but preferably have a functionality from about 2 to 4. The polyester polyols preferably are diols, triols, or combinations of both. The polyester polyols may be of the formula where R is an aliphatic group having 3 to 12 carbon atoms, and $R^1$ is an aliphatic or aromatic group having up to 14 carbon atoms. The polyester polyols preferably have a number average molecular weight of 500 to 5,000, more preferably 750 to 4,000, and even more preferably 1,000 to 3,000. The polyester polyols preferably have an acid number no greater than 1.0. More preferably, the polyester polyol has an acid number of no greater than 0.7. Acid number can be determined in accordance with ASTM D 4662-93.

The polyester polyols may be formed from three reactants: an aromatic acid, an aliphatic acid, and a diol. The two acids are preferably used in a 1:1 molar ratio. The weight percent of the aromatic acid preferably is about 15 to 40 percent, more preferably 20 to 35 percent. The weight percent of the aliphatic acid preferably is about 20 to 45 percent, more preferably 25 to 40 percent. The diol is used in an appropriate quantity for reaction with the acids and has a chain length of 3 to 12 carbon atoms, more preferably, 4 to 8.

The aromatic acid can be a diacid such as isophthalic acid, and the aliphatic acid can be a diacid such as azelaic acid. An aromatic diacid typically contains a single aromatic nucleus (5–6 carbon atoms) but may contain 2 or 3 aromatic rings (10 or 14 ring atoms). An aliphatic diacid typically contains 4 to 10 carbon atoms, more typically 6 to 8.

The diol used to produce the polyester polyol may contain about 3 to 12 carbon atoms and may be, for example, 1,6-hexane diol, 1,4-butane diol, 2-methyl-1,3 propane diol, neopentyl glycol, or cyclohexane dimethylol.

An example of a commercially available polyester polyol is Rucoflex™ S-1035-55 from Ruco Polymer Corporation of Hicksville, N.Y. This polyester polyol is believed to contain approximately 40 weight percent 1,6-hexane diol, about 28 weight percent isophthalic acid, and about 32 weight percent azelaic acid. Other commercially available polyester polyols that may be useful include: Desmophen™ polyols from Miles, Inc., Pittsburgh, Pa.; Lexorez™ polyols from Inolex Chemical Co., Philadelphia, Pa.; and Formez™ polyols from Witco Corporation, New York, N.Y.

The polyisocyanates useful in this invention contain at least two isocyanate groups bonded non-conjugatively to at least one aromatic nucleus. Typically, there are 1–20 carbon atoms, more typically 1–2 carbon atoms, located between each isocyanate group and the aromatic nucleus to which it is attached. Preferably, two isocyanate groups are bonded to each aromatic nucleus in the 1,3 positions of a six-membered aromatic ring. Examples of the polyisocyanates include:

meta-tetramethylxylene diisocyanate (TMXDI);

xylene diisocyanate;

poly(dimethyl meta-isopropenyl benzyl isocyanate);

(formed by reacting dimethyl meta-isopropenyl benzyl isocyanate through the double bond) where x is an integer of 2 to 20; and poly(phenol-formaldehyde) N-(alkyleneisocyanatocarbamate);

where R is an aliphatic moiety containing 1 to 20 carbon atoms, and x is as recited above.

Other examples of aromatic polyisocyanates include toluene diisocyanate (TDI), methylene-bis(4-phenyl) isocyanate (also referred to as diphenyl methane diisocyanate or MDI), and polyphenylene polymethylene isocyanate (PMDI). These polyisocyanates have the isocyanate groups bonded conjugatively to the aromatic nucleus but may be used in conjunction with the aromatic polyisocyanates discussed above. Mixtures and oligomers and polymers of the above polyisocyanates also may be employed and are considered to be polyisocyanates as the term is used herein if there is more than one isocyanate functional group.

Examples of suitable commercially available polyisocyanates include TMXDI (Cytec Industries, West Patterson, N.J.); Mondur CB-75 (Miles Inc., Pittsburgh, Pa.); and Desmodur W (Miles Inc., Pittsburgh, Pa.).

Useful chain extenders include diols and diamines such as 1,4 butane diol, 1,6 cyclohexane dimethanol, 1,6 hexane diol, 2-methyl-1,3 propane diol, bisphenol A, polyalkyleneoxide polyols having molecular weights of 100 to 500, and 4,4'-methylene bis(2-chloroaniline). Chain extenders also may include triols such as glycerin, trimethylolpropane, et cetera. A preferred chain extender is 1,4-butanediol.

The reaction mixture preferably has an isocyanate to hydroxyl ratio of 0.9 to 1.2, more preferably 1 to 1.1. The ratio of isocyanate groups to hydroxyl groups includes only the isocyanate groups on the polyisocyanate, but the hydroxyl groups of both the polyester polyol and chain extender are used to calculate the number of hydroxyl groups. The weight percent chain extender to polyester polyol preferably is about 0.5 to 5, more preferably about 0.7 to 4, and even more preferably 0.9 to 3.

A catalyst generally is employed in the reaction mixture. Catalysts for reacting polyisocyanates and active hydrogen-containing compounds are well-known in the art; see, for example, U.S. Pat. No. 4,495,061. Preferred catalysts include organometallic compounds and amines. The organometallic compounds may be organotin compounds such as dimethyltin dilaurate, dibutyltin dilaurate, dibutyltin dimercaptide, dimethyltin dithioglycolate, and dioctyltin dithioglycolate. The amine catalysts preferably are tertiary amines such as triethylene diamine, B, B"-dimorpholinodiethyl ether, and tris(dimethylamino ethyl)phenol. Generally, the catalyst is employed in the reaction mixture at 0.05 to 0.30 weight percent, preferably 0.06 to 0.20 weight percent, and more preferably 0.07 to 0.15 weight percent.

In addition to the above components, the reaction mixture may contain other additives such as adhesion promoters. Examples of adhesion promoters include silanes that are isocyanate-functional, amine-functional, mercapto-functional, and glycidyl-functional. Other adhesion promoters include organo-functional chromium compounds, organo-functional titaniums, and chelating agents such as disclosed in U.S. patent application Ser. No. 08/216,404 entitled Retroreflective Article And Method Of Making The Same filed on Mar. 23, 1994, now U.S. Pat. No. 5,474,827 incorporated here by reference.

Additionally, the binder layer may contain colorants (for example, pigments, dyes, metal flakes), fillers, stabilizers (for example, thermal stabilizers and antioxidants such as hindered phenols and light stabilizers such as hindered amines or ultraviolet stabilizers), flame retardants, flow modifiers (for example, surfactants such as fluorocarbons or silicones), plasticizers, and elastomers. Care should be taken when selecting such additives because some may detrimentally affect laundering durability. For example, high levels of flame retardants such as melamine pyrophosphate may have a deleterious effect on the article's retroreflective performance after laundering. Preferred colorants for articles having aluminum retroreflective layers include black dyes such as metal-azo dyes.

The binder layer typically is a continuous, fluid-impermeable, polymeric, sheet-like layer that has a thickness of about 1 to 250 microns. Preferably, the thickness is about 50 to 150 microns. Thicknesses less than 50 microns may be too thin to adhere to both the substrate and the optical elements, and thicknesses greater than 150 microns may unnecessarily stiffen the article and add to its cost.

As indicated above, optical elements are supported by the binder layer to alter the direction of light. The optical elements can be microspheres that, preferably, are substantially spherical in shape in order to provide the most uniform and efficient retroreflection. The microspheres preferably also are substantially transparent so as to minimize light absorption so that a large percentage of incident light is retroreflected. The term "transparent" is used to mean capable of transmitting light. The microspheres often are substantially colorless but may be tinted or colored in some other fashion. The microspheres may be made from glass, a non-vitreous ceramic composition, or a synthetic resin. In general, glass microspheres and non-vitreous ceramics are preferred because they tend to be harder and more durable than microspheres made from synthetic resins. Examples of microspheres that may be useful in this invention are disclosed in the following U. S. Pat. Nos. 1,175,224, 2,461,011, 2,726,161, 2,842,446, 2,853,393, 2,870,030, 2,939,797, 2,965,921, 2,992,122, 3,468,681, 3,946,130, 4,192,576, 4,367,919, 4,564,556, 4,758,469, 4,772,511, and 4,931,414. The disclosures of these patents are incorporated here by reference.

The microspheres typically have an average diameter of about 30 to 200 microns. Microspheres smaller than this range tend to provide lower levels of retroreflection, and microspheres larger than this range may impart an undesirably rough texture to the retroreflective article or may undesirably reduce its flexibility. Microspheres used in the present invention typically have a refractive index of about 1.7 to about 2.0, the range typically considered to be useful in exposed lens retroreflective products.

As mentioned above, optical elements used in this invention can have a metal reflective layer disposed beneath the embedded portions of the optical elements to provide a multitude of retroreflective elements. Preferably, the metal reflective layer is disposed on the embedded or rear portions of the optical elements. The term "metal reflective layer" is used in here to mean a layer comprising elemental metal in pure or alloy form which is capable of reflecting light, preferably specularly reflecting light. The metal may be a continuous coating produced by vacuum-deposition, vapor coating, chemical-deposition, or electroless plating. The metal layer should be thick enough to reflect incoming light. Typically, the metal reflective layer is about 50 to 150 nanometers thick.

A variety of metals may be used to provide a specularly reflective metal layer. These include aluminum, silver, chromium, nickel, magnesium, and the like, in elemental form. Aluminum and silver are preferred because they tend to provide good retroreflective brightness. When using aluminum, some of the metal may be in the form of the metal oxide and/or hydroxide. Although the reflective color of a silver coating can be brighter than an aluminum coating, an aluminum layer normally is more preferred because it can provide better laundering durability when adhered to a glass optical element.

In lieu of a metal reflective layer, a dielectric mirror may be used as a specularly reflective layer. The dielectric mirror may be similar to known dielectric mirrors disclosed in U.S. Pat. Nos. 3,700,305 and 4,763,985 to Bingham. The disclosures of these patents are incorporated here by reference.

In using dielectric mirrors, the microspheres typically have a refractive index $n_2$ and have a layer of transparent material disposed thereon which has a refractive index $n_1$. The opposite face of the transparent material having refractive index $n_1$, is in contact with a material having a refractive index $n_3$. Both $n_2$ and $n_3$ have a refractive index of at least 0.1, preferably at least 0.3, higher or lower than $n_1$. The transparent material is a layer typically having an optical thickness corresponding to odd numbered multiples (that is, 1, 3, 5, 7, ...) of about one-quarter wavelength of light in the wavelength range of about 380 to about 1,000 nanometers. Thus, either $n_2>n_1<n_3$ or $n_2<n_1>n_3$, and the materials on either side of the transparent layer may be either both higher or both lower in refractive index than $n_1$. When $n_1$ is higher than both $n_2$ and $n_3$, $n_1$ is preferably in the 1.7 to 4.9 range, and $n_2$ and $n_3$ are preferably in the 1.2 to 1.7 range. Conversely, when $n_1$ is lower than both $n_2$ and $n_3$, $n_1$ is preferably in the 1.2 to 1.7 range, and $n_2$ and $n_3$ are preferably in the 1.7 to 4.9 range.

The dielectric mirror preferably comprises a contiguous array of materials, at least one being in layer form, having an alternating sequence of refractive indices. In a preferred embodiment, the contiguous array has from two to seven layers, preferably three to five layers, adjacent to the spherical lens element. Desirably all are light transparent materials and are clear or essentially colorless to minimize light absorption and maximize display of an underlying colored binder layer. A dielectric mirror can provide very good retroreflectivity; although, it typically is not as efficient a reflector as a reflective metal layer.

Among the many compounds that may be used in providing transparent materials within the desired refractive index range are: high index materials such as CdS, $CeO_2$, CsI, GaAs, Ge, InAs, InP, InSb, $ZrO_2$, $Bi_2O_3$, ZnSe, ZnS, $WO_3$, PbS, PbSe, PbTe, RbI, Si, $Ta_2O_5$, Te, $TiO_2$; low index materials such as $Al_2O_3$, $AlF_3$, $CaF_2$, $CeF_3$, LiF, $MgF_2$, NaCle, $Na_3AlF_6$, $ThOf_2$, elastomeric copolymers of perfluoropropylene and vinylidene fluoride (refractive index of>> 1.38), et cetera. Other materials are reported in Thin Film Phenomena, K. L. Chopra, page 750, McGraw-Hill Book Company, New York, (1969). Preferred succeeding layers contain cryolite ($Na_3AlF_6$) and zinc sulfide.

Figure 2:
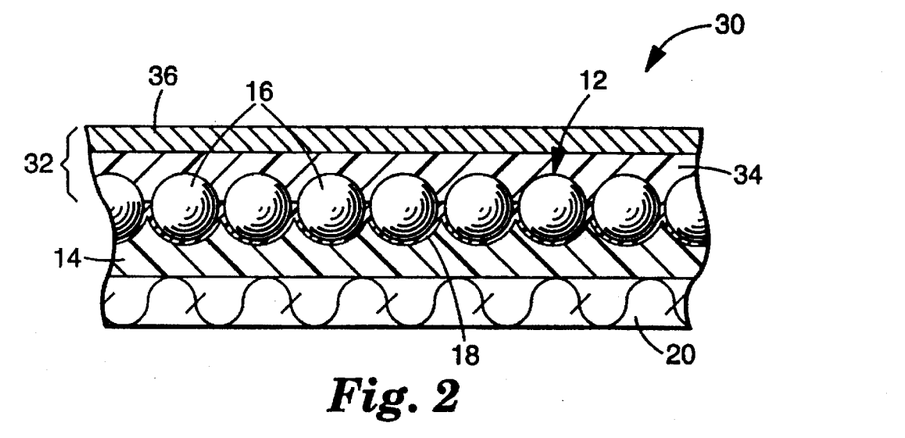
FIG. 2 illustrates a transfer article 30 that contains a retroreflective article 10 of the present invention.

A retroreflective article 10 can be made by first forming article 30 shown in FIG. 2. Article 30 is commonly referred to as a transfer article. To produce a transfer article 30, a multitude of retroreflective elements 12 are partially embedded in the binder layer 14. This can be accomplished by cascading transparent microspheres 16 onto a carrier web 32 in a desired temporary arrangement. Microspheres 16 preferably are packed as closely as possible on the carrier 32, and may be so arranged by any convenient process, such as printing, screening, cascading, or with a hot can roll. Carrier web 32 can include a heat-softenable polymer layer 34 on a paper sheet 36. Examples of useful polymer layers 34 for carrier web 32 include: polyvinyl chloride; polyolefins such as polyethylene, polypropylene, and polybutylene; and polyesters; et cetera. For a further discussion of applying microspheres to the carrier web:, see U.S. Pat. Nos. 4,763,985; 5,128,804; and 5,200,262, the disclosures of which are incorporated here by reference.

Polymer layer 34 retains microspheres 16 in the desired arrangement. Depending in part on the characteristics of the carrier web 32 and microspheres 16, it may be desirable to condition carrier 32 and/or microspheres 16 by applying selected release agents or adhesion promoters to achieve desired carrier release properties.

A reflective layer 18 then is applied to carrier web 32 on the side where the microspheres protrude from. The size of the retroreflective elements 12 as indicated by the portion of the microspheres covered with the reflective layer 18, may be controlled in part by controlling the depth to which the microspheres 16 are embedded in the carrier. After retroreflective elements 12 are created, the binder layer 14 can be formed on the specularly reflective layer to produce article 30.

The binder layer 14 can be formed over the reflective layer 18 by mixing the reactants together and quickly coating them over the reflective layer 18. The courting typically is heated to about 25° to 150° C. to increase the rate of reaction. Preferably, the coated mixture is heated to 35° to 120° C., and more preferably 40° to 110° C. The heating step enables a polyurethane binder layer to be formed that has superior resiliency, allowing the article to demonstrate extraordinary laundering durability. Additional layers of polyurethane polymer can be formed over the reflective layer as so desired to form the binder layer. Further, a fabric 20 can be adhered to the binder layer by placing it on the coated mixture before the polymer is fully reacted. After the binder layer has been formed, the carrier 32 can be separated from transfer 30, allowing retroreflective article 10 to be used for its intended purpose.

The inventive retroreflective articles may be applied to substrates using mechanical methods such as sewing. In some applications, however, it is desired to secure the article to the substrate using an adhesive layer (not shown) with or without fabric layer 20. The adhesive layer may be a pressure-sensitive adhesive, a heat-activatable adhesive, or an ultraviolet-radiation-activated adhesive. The substrate bearing the retroreflective article can be located on the outer surface of an article of clothing, enabling the retroreflective article to be displayed when the clothing is worn in its normal orientation on a person. The substrate may be, for example, a woven, knit, or nonwoven fabric containing cotton, wool, flax, nylon, olefin, polyester, cellulose, rayon, urethane, vinyl, acrylic, rubber, spandex, and the like, or it could be made from leather or paper.

Figure 3:
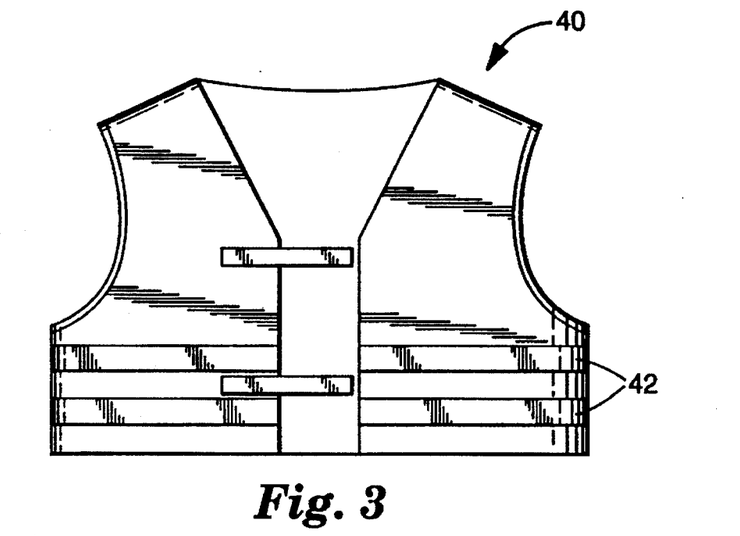
FIG. 3 illustrates an article of clothing 40 displaying a retroreflective article 10 in accordance with the present invention.
Figure 4:
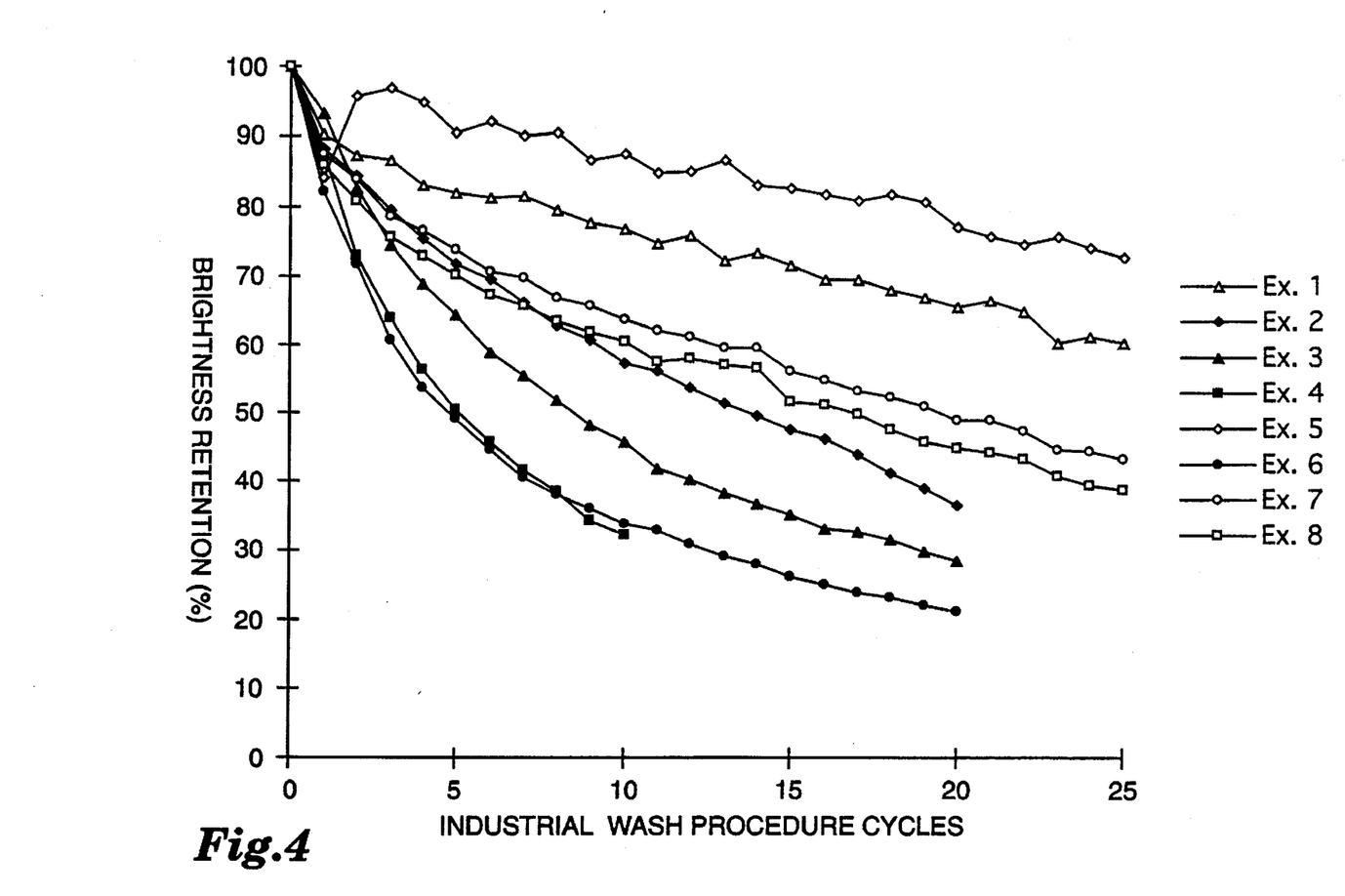
FIG. 4 is a graph showing the industrial wash performance of retroreflective articles of the invention.

FIG. 3 illustrates a safety vest 40, displaying a retroreflective article 42 in the form of an elongated sheeting or strip. Safety vests often are worn by road construction workers to improve their visibility to oncoming motorists. These kinds of vests frequently come into contact with dirt and grime, and therefore the retroreflective article must be able to withstand harsh cleaning conditions so that the vest can be reused a number of times. A retroreflective sheeting of this invention allows this kind of cleaning to be accomplished. Although a safety vest 40 has been chosen for illustration, the article of clothing of the invention may come in a variety of forms. As the term is used herein, "article of clothing" means a launderable item of wearing apparel sized and configured to be worn or carried by a person. Other examples of articles of clothing that may display retroreflective articles of the invention include shirts, sweaters, jackets (e.g. fireman's jackets), coats, pants, shoes, socks, gloves, belts, hats, suits, one-piece body garments, bags, backpacks, et cetera. Advantages and other properties and details of the invention are further illustrated in the following Examples. It is to be expressly understood, however, that while the examples serve this purpose, the particular ingredients and amounts used and other conditions are not to be construed in a manner that would unduly limit the scope of this invention. The following Examples have been selected to illustrate in detail how to make preferred embodiments of the invention and how the preferred embodiments generally perform.

EXAMPLES

The following test methods were used in the Examples.

Industrial Laundering Procedure

Launderability was evaluated by washing and drying a piece of fabric to which the retroreflective article was applied. The combined sequence of washing and drying is referred to as a cycle. The samples were washed using a Milnor System 7 Washing Machine Model 30015M4G from Pellerin Milnor Corp. in accordance with program no. 7 for heavily soiled, colored fabrics. The fabric was a 100 percent cotton towel, and the retroreflective article was secured to the fabric by sewing. The washer was loaded with enough pieces (approximately 80) of fabric (about 45 centimeters (cm) by 75 cm) to make a 28 pound load including from one to four pieces of fabric having several (typically about 5) retroreflective articles of the invention about 5 by 15 centimeters in size secured thereto. The cleaning agents used were 30 grams of FACTOR™ detergent (from Diversey Fabrilife Chemicals, Inc., Cincinnati, Ohio) containing by weight, approximately, 40 percent tetrasodium pyrophosphate, 30 percent nonylphenoxypoly(ethyleneoxy) ethanol, 20 percent sodium carbonate and 10 percent amorphous silica, and 60 grams of ORTHOSIL™ (a pH builder from Elf Atochem Noah America, Philadelphia, Pa., containing approximately 40 weight percent NaOH and 60 weight percent sodium metasilicates). In Program No. 7 the following steps are carried out to complete the washing portion of a cycle.

| Operation | Time (minutes) |
|---|---|
| Suds | 10 |
| Flush | 2 |
| Flush | 7 |
| Flush | 7 |
| Flush | 2 |
| Hot Rinse | 2 |
| Split Rinse | 2 |
| Cold Rinse | 4 |
| Extract | 6 |
| Total | 41 (51:20*) |

*Total time in minutes, which includes approximate fill times

In the suds step, hot water (68 liters at 74° C.) and the cleaning agents are introduced into the machine washing basket under agitation. In the flush steps, fresh hot water (68 liters at 74° C.) is added to the washing basket after the same amount of the old water containing the cleaning agents is purged.

The rinse steps essentially are the same as the flush steps except the water becomes cooler. In the first rinse, the water is approximately 74° C., in the second rinse (split rinse), the water is approximately 46° C., and in the final cold rinse, the water is approximately 18° C. The washing basket is agitated during the flush and rinse steps. In the extract step, the machine undergoes a high-speed spin cycle to remove water from the washed samples. After washing but before being tested for retroreflectivity, the samples were dried in a Maytag™ home dryer on regular setting for 30 minutes to complete an Industrial Wash Procedure Cycle. After the designated number of cycles, the retroreflective brightness of the middle of each sample was determined.

Retroreflective Brightness Test

The coefficient of retroreflection, $R_A$, was measured in accordance with standardized test ASTM E 810-93b. The test results are expressed below as the percentage of initial retroreflective brightness, where $R_A$ is expressed in candelas per lux per square meter ($cd.lx^{-}.m^{-2}$). The entrance angle used in ASTM E 810-93b was −4 degrees, and the observation angle was 0.2 degrees. Further reference to "ASTM E 810-93b" means ASTM E 810-93b where the entrance and observation angles are as specified in the previous sentence.

Glossary of Terms

Rucoflex™ S-1035-55, a polyester polyol from Ruco Polymer Corp. BDO: 1,4-butane diol Silane A 1310: a gamma-isocyanato-propyltriethoxysilane from OS Specialties, Inc., Danbury, Conn.

TMXDI: tetramethylxylylene diisocyanate from Cytec Industries, West Patterson, N.J.

Mondur™ CB-75: a toluene diisocyanate based polyisocyanate from Miles Inc., Pittsburgh, Pa.

Fomrez™ SUL-3: dibutyltin diacetate from Witco Corp., New York N.Y.

NCO:isocyanate

Desmodur™ N-100: a biuret of hexamethylene diisocyanate from Miles

Jeffamine™ D-2000: a 2000 molecular weight diamine from Huntsman Chemical Corp., Salt Lake City, Utah Desmophen™ XP-7053: a cycloaliphatic diamine (eq. wt.=277) from Miles DBTDL: dibutyltin dilaurate

Example 1

A specularly-reflective aluminum layer was vapor deposited over the protruding portions of glass microspheres to form a monolayer of retroreflective elements. The glass microspheres had an average diameter of about 40 to 90 micrometers and were partially and temporarily embedded in a carrier sheet. The carrier sheet included paper juxtaposed against a polyethylene layer, and the microspheres were embedded in the polyethylene layer. The carrier sheet supporting the aluminum coated microspheres was used as a base for applying a bead bond formulation that contained:

30.0 g. Rucoflex™ S-1035-55
0.30 g. 1,4-Butane Diol
1.20 g. OSi-Silane A-1310
3.96 g. Cytec-TMXDI
1.85 g. Miles-Mondur™ CB-5, trifunctional aromatic isocyanate
0.05 g. Witco-Fomrez™ SUL-3, catalyst The reaction for forming the polyurethane was carried out by weighting the reactants into a vessel in the order printed above. The reactants were mixed by hand at room temperature and quickly coated at a 4 mil thickness onto the aluminum vapor coat layer. The coating was placed in a 66° C. (150° F.) oven for 30 seconds, after which a 100 percent polyester fabric was adhered to it. The retroreflective article was then put in a 110° C. (230° F.) oven for ten minutes. The heating produced an elastomeric, thermoset polyester polyurethane as a binder layer that was located between the vapor coated beads and the fabric.

Examples 2–8

Examples 2–15 were prepared as described above, except the reactants and conditions varied as set forth in Table 1. Amounts are expressed in grams.

TABLE 1

| Example | Rucoflex™ S-1035-55 | 1,4 Butane Diol | Silane A-1310 | Cytec™ TMXDI | Desmodur™ CB-75 | Fomrez™ SUL-3 | Dibutylin Dilaurate | Jeffamine D-2000 | Desmodur™ N-100 | Desmophen™ XP-7053 |
|---|---|---|---|---|---|---|---|---|---|---|
| 1 | 30.0 | 0.30 | 1.20 | 3.96 | 1.85 | 0.05 | | | | |
| 2a | 30.0 | 0.30 | 1.20 | 3.49 | 3.09 | 0.05 | | | | |
| 3b | 30.0 | 0.30 | 1.20 | 3.03 | 4.31 | 0.05 | | | | |
| 4c | 30.0 | 0.30 | 1.20 | 2.33 | 6.16 | 0.05 | | | | |
| 5d | 30.0 | 0.30 | 1.20 | 4.67 | | | 0.08 | | | |
| 6e | 30.0 | 0.30 | 1.20 | 3.49 | | 0.05 | | | 1.82 | |
| 7f | 30.0 | | 1.20 | 3.16 | 2.80 | 0.05 | | | | 0.90 |
| 8g | 30.0 | | 1.20 | 2.91 | 2.57 | 0.05 | | 0.30 | | | aCarried out according to Example 1, except coating was placed in an oven at 66° C. (150° F.) for 120 seconds followed by 30 seconds at 104° C. (220° F.). After the polyester fabric was applied, the article was placed in a 104° C. (220° F.) oven for 10 minutes.
bCarried out according to Example 1.
cCarried out according to Example 1.
dCarried out according to Example 1, except the coating was allowed to stand at room temperature for 2 minutes followed by 2 minutes in a 66° C. oven and in a 104° C. oven for 2.5 minutes before laminating the fabric to the sample.
eCarried out according to Example 1, except coating was placed in an oven at 66° C. for 45 seconds. After the polyester fabric was applied, the article was placed in a 104° C. oven for 10 minutes.
fCarried out according to Example 1.
gCarried out according to Example 1.

The main reaction components and their ratios and amounts relative to each other are summarized below in Table 2.

TABLE 2

| Example | NCO (1) | NCO (2) | Ratio (1):(2) | Chain Extend. | Chain Extend. Level* | NCO/OH Ratio | Catalyst |
|---|---|---|---|---|---|---|---|
| 1 | TMXDI | CB-75 | 85:15 | BDO | 1.0 | 1.05 | SUL-3 |
| 2 | TMXDI | CB-75 | 75:25 | BDO | 1.0 | 1.05 | SUL-3 |
| 3 | TMXDI | CB-75 | 65:35 | BDO | 1.0 | 1.05 | SUL-3 |
| 4 | TMXDI | CB-75 | 50:50 | BDO | 1.0 | 1.05 | SUL-3 |
| 5 | TMXDI | | | BDO | 1.0 | 1.05 | DBTDL |
| 6 | TMXDI | N-100 | 75:25 | BDO | 1.0 | 1.05 | SUL-3 |
| 7 | TMXDI | CB-75 | 75:25 | X-P7053 | 3.0 | 1.05 | SUL-3 |
| 8 | TMXDI | CB-75 | 75:25 | D-2000 | 1.0 | 1.05 | SUL-3 |

*Chain extender level is in units of weight percent to polyol.

The samples were washed according to the Industrial Laundering Procedure and were tested to determine the coefficient of retroreflective brightness, $R_A$, according to ASTM E 810-93b. The percent Retroreflective Brightness Retained was determined as a percent of initial retroreflective brightness. $R_A$ results are set forth below in Table 3, and Percent Retroreflective Brightness Retained is set forth in Table 4.

TABLE 3

$R_A$ Values

| # Cycles | Ex. 1 | Ex. 2 | Ex. 3 | Ex. 4 | Ex. 5 | Ex. 6 | Ex. 7 | Ex. 8 |
|---|---|---|---|---|---|---|---|---|
| 0 | 438 | 624 | 608 | 650 | 392 | 681 | 616 | 634 |
| 1 | 396 | 551 | 567 | 571 | 330 | 560 | 540 | 545 |
| 2 | 383 | 527 | 503 | 474 | 375 | 489 | 517 | 512 |
| 3 | 380 | 496 | 453 | 415 | 380 | 413 | 484 | 479 |
| 4 | 364 | 470 | 419 | 367 | 372 | 365 | 472 | 462 |
| 5 | 359 | 448 | 391 | 328 | 355 | 335 | 455 | 445 |
| 6 | 256 | 434 | 358 | 297 | 361 | 304 | 435 | 427 |
| 7 | 357 | 412 | 338 | 271 | 353 | 276 | 430 | 416 |
| 8 | 348 | 391 | 316 | 251 | 355 | 260 | 411 | 402 |
| 9 | 340 | 379 | 294 | 223 | 340 | 246 | 405 | 392 |
| 10 | 336 | 358 | 278 | 209 | 343 | 230 | 392 | 383 |
| 11 | 327 | 351 | 255 |  | 333 | 224 | 382 | 365 |
| 12 | 332 | 335 | 245 |  | 334 | 210 | 376 | 368 |
| 13 | 316 | 321 | 233 |  | 340 | 198 | 367 | 362 |
| 14 | 321 | 310 | 223 |  | 326 | 190 | 367 | 359 |
| 15 | 313 | 297 | 213 |  | 324 | 178 | 346 | 328 |
| 16 | 304 | 288 | 201 |  | 320 | 170 | 338 | 324 |
| 17 | 304 | 274 | 198 |  | 317 | 162 | 328 | 316 |
| 18 | 298 | 258 | 192 |  | 320 | 158 | 322 | 302 |
| 19 | 293 | 243 | 180 |  | 316 | 150 | 314 | 290 |
| 20 | 287 | 227 | 172 |  | 302 | 144 | 302 | 284 |
| 21 | 291 |  |  |  | 296 |  | 301 | 280 |
| 22 | 284 |  |  |  | 292 |  | 292 | 274 |
| 23 | 264 |  |  |  | 296 |  | 275 | 258 |
| 24 | 268 |  |  |  | 290 |  | 274 | 250 |
| 25 | 264 |  |  |  | 285 |  | 267 | 246 |

TABLE 4

Brightness Retention (%)

| # Cycles | Ex. 1 | Ex. 2 | Ex. 3 | Ex. 4 | Ex. 5 | Ex. 6 | Ex. 7 | Ex. 8 |
|---|---|---|---|---|---|---|---|---|
| 0 | 100.0 | 100.0 | 100.0 | 100.0 | 100.0 | 100.0 | 100.0 | 100.0 |
| 1 | 90.4 | 88.3 | 93.3 | 87.8 | 84.2 | 82.2 | 87.7 | 86.0 |
| 2 | 87.4 | 84.5 | 82.7 | 72.9 | 95.7 | 7.18 | 83.9 | 80.8 |
| 3 | 86.8 | 79.5 | 74.5 | 63.8 | 96.9 | 60.6 | 78.6 | 75.6 |
| 4 | 83.1 | 75.3 | 68.9 | 56.5 | 94.9 | 53.6 | 76.6 | 72.9 |
| 5 | 82.0 | 71.8 | 64.3 | 50.5 | 90.6 | 49.2 | 73.9 | 70.2 |
| 6 | 81.3 | 69.6 | 58.9 | 45.7 | 92.1 | 44.6 | 70.6 | 67.4 |
| 7 | 81.5 | 66.0 | 55.6 | 41.7 | 90.1 | 40.5 | 69.8 | 65.6 |
| 8 | 79.5 | 62.7 | 52.0 | 38.6 | 90.6 | 38.2 | 66.7 | 63.4 |
| 9 | 77.6 | 60.7 | 48.4 | 34.3 | 86.7 | 36.1 | 65.7 | 61.8 |
| 10 | 76.7 | 57.4 | 45.7 | 32.2 | 87.5 | 33.8 | 63.6 | 60.4 |
| 11 | 74.7 | 56.3 | 41.9 |  | 84.9 | 32.9 | 62.0 | 57.6 |
| 12 | 75.8 | 53.7 | 40.3 |  | 85.2 | 30.8 | 61.0 | 58.0 |
| 13 | 72.1 | 51.4 | 38.3 |  | 86.7 | 29.1 | 59.6 | 57.1 |
| 14 | 73.3 | 49.7 | 36.7 |  | 83.2 | 27.9 | 59.6 | 56.6 |
| 15 | 71.5 | 47.6 | 35.0 |  | 82.7 | 26.1 | 56.2 | 51.7 |
| 16 | 69.4 | 46.2 | 33.1 |  | 81.6 |  | 54.9 | 51.1 |
| 17 | 69.4 | 43.9 | 32.6 |  | 80.9 |  | 53.2 | 49.8 |
| 18 | 68.0 | 41.3 | 31.6 |  | 81.6 |  | 52.3 | 47.6 |
| 19 | 66.9 | 38.9 | 29.6 |  | 80.6 |  | 51.0 | 45.7 |
| 20 | 65.5 | 36.4 | 28.3 |  | 77.0 |  | 49.0 | 44.8 |
| 21 | 66.4 |  |  |  | 75.5 |  | 48.9 | 44.2 |
| 22 | 64.8 |  |  |  | 74.5 |  | 47.4 | 43.2 |
| 23 | 60.3 |  |  |  | 75.5 |  | 44.6 | 40.7 |
| 24 | 61.2 |  |  |  | 74.0 |  | 44.5 | 39.4 |
| 25 | 60.3 |  |  |  | 72.7 |  | 43.3 | 38.8 |

The data in Tables 3 and 4 demonstrate that samples of the invention exhibit excellent industrial laundering durability.

I claim:

1. A retroreflective article comprising:

a layer of retroreflective elements at least partially embedded in a binder layer that comprises a polyurethane polymer that is the reaction product of (i) a polyester polyol and (ii) a polyisocyanate that contains at least two isocyanate groups bonded non-conjugatively to at least one aromatic nucleus.

2. The retroreflective article of claim 1, wherein the polyurethane polymer is formed by reacting a polyester polyol, chain extender, and polyisocyanate in a one-shot process.

3. The retroreflective article of claim 1, wherein the polyester polyol is the reaction product of an aromatic acid, an aliphatic acid, and a diol.

4. The retroreflective article of claim 3, wherein the aromatic acid and aliphatic acid are used in 1:1 molar ratio in producing the polyester polyol, and the diol has a chain length of 3 to 12 carbon atoms.

5. The retroreflective article of claim 3, wherein the polyester polyol has a number average molecular weight of 500 to 5,000.

6. The retroreflective article of claim 5, wherein the polyester polyol has a number average molecular weight of 750 to 4,000.

7. The retroreflective article of claim 6, wherein the polyester polyol has a number average molecular weight of 1,000 to 3,000.

8. The retroreflective article of claim 1, wherein the polyester polyol has an acid number no greater than 1.0.

9. The retroreflective article of claim 8, wherein the polyester polyol has an acid number no greater than 0.7.

10. The retroreflective article of claim 1, wherein the polyester polyol has a functionality of 2 to 4.

11. The retroreflective article of claim 1, wherein the polyester polyol is a diol, triol, or combination thereof.

12. The retroreflective article of claim 1, wherein the polyisocyanates are selected from the group consisting of meta-tetramethylene diisocyanate, xylene diisocyanate, poly(dimethyl-meta-isopropenylbenzylisocyanate), poly(phenol-formaldehyde)-N-(alkyleneisocyanatocarbamate), and combinations thereof.

13. The retroreflective article of claim 12, wherein the polyisocyanate is meta-tetramethylene diisocyanate.

14. The retroreflective article of claim 3, wherein the polyurethane polymer is formed from a reaction mixture having an isocyanate to hydroxyl ratio of 0.9 to 1.2, and wherein the weight percent chain extender to polyester polyol is about 0.5 to 5.

15. The retroreflective article of claim 14, wherein the reaction mixture has an isocyanate to hydroxyl ratio of 1 to 1.1, and wherein the weight percent chain extender to polyester polyol is 0.7 to 4.

16. The retroreflective article of claim 1, wherein there are 1 to 20 carbon atoms located between the aromatic nucleus and the isocyanate group.

17. The retroreflective article of claim 16, wherein there are two isocyanate groups bonded non-conjugatively to a six-membered aromatic nucleus and there are 1 to 2 carbon atoms located between the aromatic nucleus and the isocyanate groups.

18. The retroreflective article of claim 17, wherein the weight percent chain extender to polyester polyol is 0.9 to 3.

19. The retroreflective article of claim 1, wherein the polyurethane polymer is a thermoset elastomer.

20. The retroreflective article of claim 1, wherein the polyurethane polymer is formed in the presence of an organometallic or amine catalyst.

21. The retroreflective article of claim 2, wherein the chain extender is 1,4 butane diol.

22. The retroreflective article of claim 2, wherein the weight percent chain extender to polyester polyol is 0.5 to 5.

23. The retroreflective article of claim 1, wherein the polyurethane polymer is formed in the presence of dibutyltin dilaurate as a catalyst.

24. The retroreflective article of claim 1, wherein the reaction mixture contains an adhesion promoter.

25. The retroreflective article of claim 1, wherein the binder layer has a thickness of 1 to 250 microns, and the retroreflective elements include transparent microspheres that have an average diameter 30 to 200 microns and that have an aluminum or silver reflective layer disposed behind the embedded portions of the microspheres.

26. The retroreflective article of claim 1, retaining at least 30 percent of its initial retroreflective brightness after ten industrial laundering procedure cycles.

27. The retroreflective article of claim 26, retaining at least 60 percent of its initial retroreflective brightness after ten industrial laundering procedure cycles.

28. The retroreflective article of claim 1, wherein the retroreflective elements include a layer of microspheres and a layer of specularly reflective material.

29. The retroreflective article of claim 28, wherein the microspheres have an average diameter of about 30 to 200 microns.

30. The retroreflective article of claim 29, wherein the layer of specularly reflective material includes a layer of aluminum about 50 to 150 nanometers thick.

31. A transfer that comprises the retroreflective article of claim 29, and further comprises a carrier web into which the layer of microspheres is partially embedded.

32. An article of clothing that comprises the retroreflective article of claim 1 and a substrate that forms part of an outer portion of the article of clothing, the retroreflective article being secured to the substrate.

* * * * *

UNITED STATES PATENT AND TRADEMARK OFFICE
CERTIFICATE OF CORRECTION

PATENT NO.: 5,645,938
DATED: July 8, 1997
INVENTOR(S): Michael D. Crandall

It is certified that error appears in the above-identified patent and that said Letters Patent is hereby corrected as shown below:

Title page, item [57] Abstract, line 4, after "polyol" insert --,-- and move the following language "that contains an aromatic nucleus and has at least two isocyanate groups bonded non-conjugatively to the aromatic nucleus," to line 7 after "polyisocyanate".

Col. 2, line 21, "is" should read --in--.

Col. 4, line 15, "dimethylol" should read --dimethanol--.

Col. 8, line 1, "binder layer 14" should read --carrier web 32--.

Col. 8, line 34, "courting" should read --coating--.

Col. 9, line 62, "Noah" should read --North--.

Col. 10, line 42, "cd.lx$^-$.m$^{-2}$)." should read --cd·lx$^{-1}$·m$^{-2}$).--

Col. 10, line 50, "BDO:1,4-butane diol" should be a new paragraph.

Col. 10, line 52, "OS" should read --OSi--.

Col. 11, Table 1, in the headings, "TMXD1" should read --TMXDI--; "Desmodur" should read --Mondur--; and "Dibutyin" should read --Dibutyltin--.

UNITED STATES PATENT AND TRADEMARK OFFICE
CERTIFICATE OF CORRECTION

PATENT NO.: 5,645,938
DATED: July 8, 1997
INVENTOR(S): Michael D. Crandall

It is certified that error appears in the above-identified patent and that said Letters Patent is hereby corrected as shown below:

Col. 11, Table 2, Example 7, "X-P7053" should read --XP-7053--.

Col. 11, line 61, "CB-5." should read --CB-75.--.

Col. 13, in Table 3, Cycle 6, Ex. 1, "256" should read --356--.

Col. 14, line 31, "meta-tetramethylene" should read --meta-tetramethylxylenel--.

Col. 14, line 36, "meta-tetramethylene" should read --meta-tetramethylxylenel--.

Signed and Sealed this

Sixteenth Day of December, 1997

*Attest:*

BRUCE LEHMAN

*Attesting Officer*     *Commissioner of Patents and Trademarks*